April 29, 1969   L. A. HERÉDY   3,441,446
HIGH TEMPERATURE GALVANIC CELL
Filed April 2, 1965

INVENTOR.
LASZLO A. HERÉDY
BY Henry Kolin
ATTORNEY

United States Patent Office 3,441,446
Patented Apr. 29, 1969

3,441,446
HIGH TEMPERATURE GALVANIC CELL
Laszlo A. Herédy, Canoga Park, Calif., assignor to North American Rockwell Corporation, a corporation of Delaware
Filed Apr. 2, 1965, Ser. No. 445,016
Int. Cl. H01m 17/00, 35/02
U.S. Cl. 136—100                                        9 Claims

ABSTRACT OF THE DISCLOSURE

A matrix-electrolyte element separating molten electrodes in a high temperature galvanic cell, the element comprising an open porous ceramic tube containing in its pores an anhydrous fusible electrolyte. Preferably, a plurality of tubes are operated in parallel with a first molten metal electrode stream flowing in a given direction through the inside of the tubes and a second molten metal electrode stream flowing in countercurrent relation through the common outside region surrounding the tubes.

---

Figure 1:
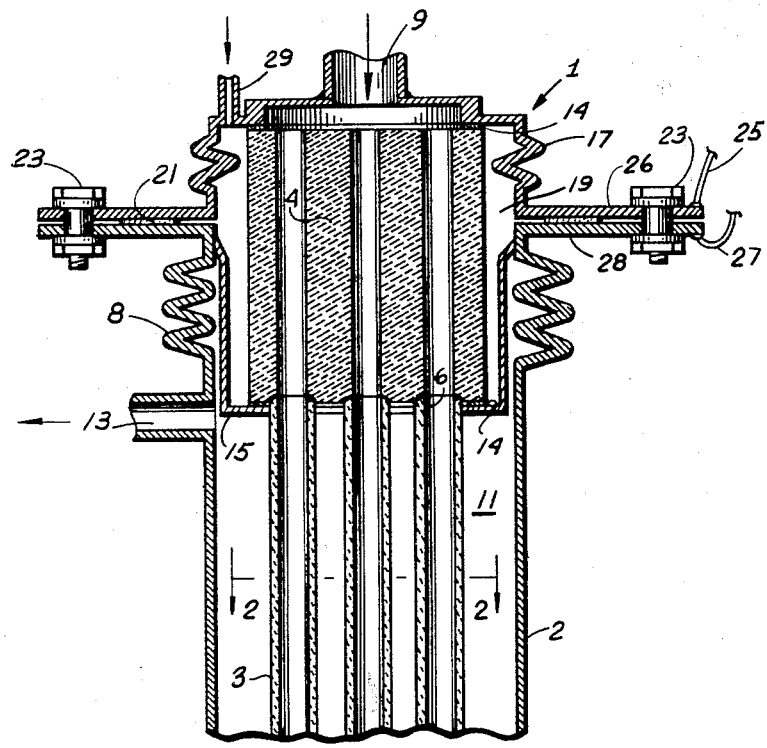
Figure 1:
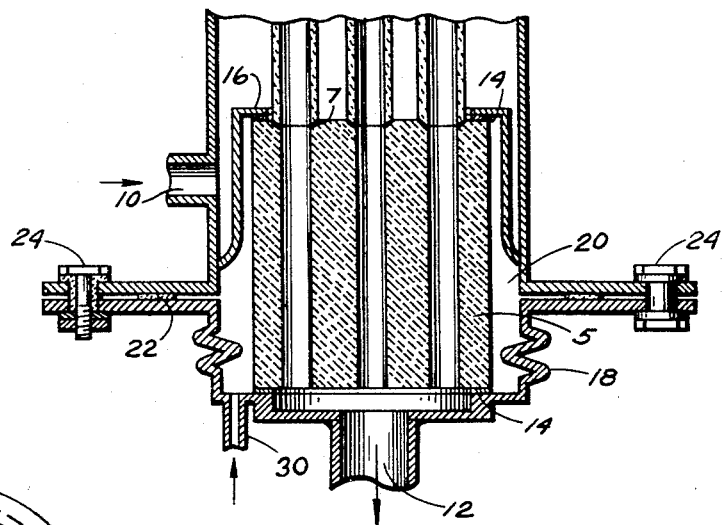

This invention relates to a porous ceramic matrix of novel shape and arrangement for use as an electrolyte element in a thermally regenerative galvanic cell. More particularly it relates to a novel liquid metal galvanic cell or battery utilizing this matrix element.

A thermally regenerative energy conversion system is a closed cycle heat engine for converting heat energy to electricity without the use of moving parts such as turbines or other rotating machinery. Galvanic cells have been heretofore considered for use as components in such thermally regenerative systems. See "The Thermally Regenerative Liquid-Metal Cell" by B. Agruss, Journal of the Electrochemical Society, vol. 110, pp. 1097–1103 (1963); "Mercury Space Power Systems" by R. E. Henderson and E. H. Hietbrink, in Direct Conversion, 1962 Pacific Energy Conversion Conference Proceedings, pp. 16–1 to 16–12 (1962).

Because both the electrodes and the electrolyte are liquid in an alkali metal-amalgam thermally regenerative galvanic cell, it is necessary to prevent mixing of the electrodes and electrolyte in the cell in order to obtain a continuous source of electric power. At the same time, there must be ion transport through the electrolyte within the cell in order for the cell to function. Thus means to immobilize the electrolyte and yet permit ion transport are required.

It has further been found in the construction of high temperature galvanic cells that the shape and arrangement of the electrolyte-matrix element is of great importance with respect to operability and cell parameters. Thus the power concentration of the cell (in watts per unit weight or unit volume) is a function of the electrolyte-matrix design. In addition, several other important features of cell construction, such as matrix strength and the relative extent and strength of the seal at the matrix surface are greatly influenced by the selection of the matrix design.

Heretofore, in galvanic cells considered for use in thermally regenerative systems, porous ceramic disks and plates have been suggested or used as matrix elements in order to provide as extensive an electrolyte surface as feasible per unit weight. Aside from problems of degradation and corrosion of the specific ceramic-electrolyte element, these disks and plates have been of relatively poor strength, have presented sealing problems at high temperature, and have resulted in a relatively low power concentration of the cell.

Accordingly, it is an object of the present invention to provide a galvanic cell for use in a thermally regenerative system that minimizes prior art disadvantages heretofore present.

Another object is to provide a cell with a relatively high power to weight ratio.

Still another object is to provide a galvanic cell with increased cell life for both space and terrestrial applications.

Still another object is to provide a galvanic cell particularly suitable for countercurrent flow of molten anode and cathode streams thereby providing optimal efficiency.

Yet another object is to provide a combined matrix-electrolyte element of novel configuration which leads to improved strength and mechanical stability.

Still another object is to provide a porous ceramic matrix configuration particularly suitable for continuous operation of a high temperature galvanic cell.

In accordance with this invention, there is provided a porous ceramic matrix in open tubular form which contains a suitable molten salt electrolyte in its pores for use in a high-temperature thermally regenerative galvanic cell. While magnesia or alumina compositions are suitable, beryllium oxide is preferred for use as the ceramic matrix material because of its superior resistance to the action of alkali metals and their amalgams, and its high thermal conductivity compared with ceramic materials such as alumina or magnesia. The beryllium oxide-electrolyte combination provides an extremely stable element for immobilizing the electrolyte for use in a galvanic cell.

The galvanic cell of this invention has an anode consisting of an alkali metal-rich amalgam of a selected alkali metal, the cathode consists of an alkali metal-poor amalgam of said alkali metal, and the selected alkali-metal salt electrolyte is contained in a porous ceramic matrix of open tubular form separating the anode and cathode electrodes. Where a particularly stable, chemically resistant matrix element is required, the anion of the alkali-metal salt electrolyte is selected from the class consisting of halides, cyanide, carbonate and mixtures thereof, carbonate being present only as a minor constituent.

The cathode and anode amalgams and the electrolyte salt contained in the tubular porous ceramic matrix, preferably of beryllium oxide, are all molten at the normal operating temperature of the cell. The term "cell" as used herein is broadly intended also to include a "battery" e.g., an assemblage in series or parallel arrangement of two or more electric cells. The term "open tubular form" is intended to exclude disk or plate arrangements with tubular side walls, such as cup-shaped arrangements. In order to provide the advantageous countercurrent flow of the molten cathode and anode streams, the porous tubes must be open and present low resistance to the flow of the molten streams. For certain applications, rods, spirals or other structural elements may be present inside the porous tubes. Such structural elements may be useful in decreasing the amount of liquid metal required to fill the cell and also in improving countercurrent flow in the tubes.

Advantageously, a tubular configuration presents greater electrode-to-electrolyte contact surface per unit of volume and weight than does a disk or plate configuration. High temperature galvanic cells utilizing the open tubular construction of this invention therefore have greater power capacity. In addition, by using a tubular configuration, additional strength is obtained and fewer sealing problems are presented. Thus, the inherent mechanical strength of a porous tube is greater than that of a porous plate of the same surface area. In addition, the specific sealing surface area (the area of the porous to dense ceramic seal surface over the effective porous electrolyte surface) is much smaller in a design using porous tubes. Similarly, the specific sealing surface area between the atmosphere and the inside of the cell is much smaller in the tubular design.

Of particular and significant advantage in the use of a tubular cell design is the comparative ease with which countercurrent electrode flow of the anode and cathode liquid metal streams may be achieved, which can be realized only with great difficulty when matrices of disk or plate configuration are used. This countercurrent flow allows for greater over-all efficiency. The advantages attainable by use of a single porous tube matrix are considerably enhanced when multitube matrices are used in which a large number of porous tubes are connected in parallel. In such an arrangement in a multitube cell, one liquid metal stream electrode is supplied through the inside of the tubes, with the other metal stream passing through the space surrounding the tubes in countercurrent relation. Thus a construction employing a plurality of tubes, preferably ranging from 10 to 200, will realize in enhanced form the inherent advantages obtainable with an open tubular construction. With such a tubular design, the compactness of the galvanic cell (measured in weight of loaded cell per unit electrolyte surface) is more than twice as favorable as in the disk design.

The ceramic material of open tubular form, i.e., permitting free and unobstructed flow of the molten electrode stream through the tube, should be of high purity, strength, and porosity. Beryllium oxide is a particularly suitable high purity ceramic, preferably over 98 percent pure with principal impurities limited to MgO or other chemically resistant oxides. Typically, a material of 99.8 percent BeO is used. Porosity of the BeO may be in the range of 30–70 percent, with 40–55 percent being typical. In general, the highest porosity consistent with adequate strength is preferred. Tortuosity, i.e., effective pore length per unit of thickness, should be low, values of 1.5 to 3 being typical.

While this invention is broadly directed to an energy conversion process and system utilizing liquid metal cells, such as an alkali metal-amalgam cell or battery, with one-stage or multiple-stage regeneration, it is preferred for most advantageous operation that the alkali metal component of the anode, cathode and electrolyte be sodium. In its more specific aspects, it is particularly preferred that the anode amalgam feed stream of the galvanic cell contain between 15 and 80 atom percent sodium, the cathode amalgam feed stream contains up to 10 atom percent sodium and the electrolyte consists of a mixed ternary or quaternary sodium salt system, the anionic components being selected from the aforementioned class consisting of halides, cyanide, carbonate and mixtures thereof, carbonate being present only as a minor constituent.

Figure 2:
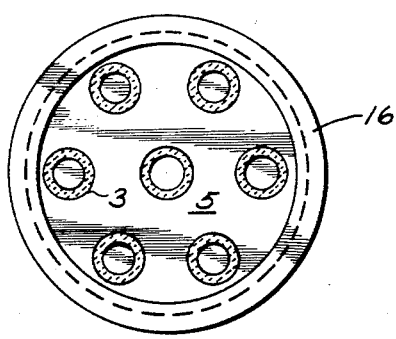

Other objects, advantages, and features of the invention will appear from the following description of a preferred embodiment of the invention wherein FIG. 1 is a view in section and in elevation of a high temperature galvanic cell in accordance with the present invention, and FIG. 2 is a cross-sectional view of the cell taken along the line 2—2 of FIG. 1, like parts bearing like identification throughout the two views.

Referring to FIG. 1, a high temperature galvanic cell 1 is shown designed for use in a continuous thermally regenerative process. The galvanic cell comprises a cylindrical metal body 2, the metal being stable at the normal operating temperature of the cell. Stainless steel is suitable and preferred. The cell is preferably employed as an alkali-metal amalgam galvanic cell for use as a thermal energy conversion device in a process such as that described in the copending application of H. L. Recht and D. E. McKenzie, S.N. 444,976, filed of even date herewith and assigned to the assignee of the present invention.

As shown in this copending application, which is incorporated herein by reference, the anode of the cell consists of an alkali metal-rich amalgam of a selected alkali metal, the cathode consists of an alkali metal-poor amalgam of said alkali metal, and the electrolyte is an anhydrous salt of the said alkali metal, the anion of the electrolyte being selected from the class consisting of halide, cyanide, carbonate, and mixtures thereof, carbonate being present only as a minor constituent. In its preferred aspects, the anode amalgam feed stream of the galvanic cell contains between 15 and 80 atom percent sodium, the cathode amalgam feed stream contains up to 10 atom percent sodium and the electrolyte consists of mixed sodium salts, the anionic components being selected from the aforementioned class. Preferably, the mixed sodium salts constitute a ternary or quaternary salt system which contains at least three components selected from the class consisting essentially of sodium cyanide, sodium fluoride, sodium iodide, and sodium carbonate, no component being present in excess of 80 mole percent, sodium carbonate being present in amount below 20 mole percent.

A particularly preferred matrix-electrolyte combination consists of a porous beryllium oxide matrix containing as electrolyte a fusible ternary salt mixture of eutectic composition consisting essentially of in mole percent, 58±1 sodium cyanide, 30±1 sodium iodide, and 12±1 sodium fluoride. This preferred electrolyte and matrix-electrolyte element are respectively described and claimed in copending applications S.N. 444,955 and S.N. 444,956 filed of even date herewith and assigned to the assignee of the present invention.

In galvanic cell 1 shown in FIG. 1 herein, a plurality of porous ceramic tubes 3 are positioned within the cylindrical body 2. These tubes are preferably of high porosity beryllia and are impregnated with the selected electrolyte composition for use in the alkali metal-amalgam cell. Upper and lower end pieces 4 and 5, preferably of dense beryllia, are used to support the porous ceramic tubes 3 and maintain them in spaced-apart relation. Upper and lower seals 6 and 7, located between the porous tubes and the corresponding dense end pieces, are pressurized by a bellows 8, preferably of stainless steel. One of the liquid-metal streams, preferably the alkali-rich amalgam anode stream, is conducted through the interior of porous tubes 3. These tubes are joined in parallel so that a common inlet 9 may be used for the incoming molten metal stream. An inlet 10 is used to feed the other liquid-metal stream, preferably the alkali-poor amalgam cathode stream, through an outside region 11 surrounding tubes 3.

In operating the alkali metal-amalgam cell, such as a sodium-amalgam cell, the molten stream entering inlet 9 will preferably constitute the anode stream such as a sodium-rich amalgam. The sodium ions from the sodium-rich amalgam in the anode stream in the interior of tubes 3 migrate through the molten electrolyte contained in the pores of tubes 3 to the cathode compartment, which will be the outside region 11 surrounding the porous ceramic tubes 3. There they unite with the mercury to form a sodium-poor amalgam of higher sodium content than originally present in this cathode compartment 11. At the same time, the sodium-rich amalgam in the anode compartment, i.e., in the tube interior, is depleted to form a sodium-poor amalgam. This sodium-poor amalgam effluent of the anode compartment will leave the cell through an outlet 12. The sodium-poor amalgam effluent from the cathode compartment will emerge through an outlet 13. Thus for preferred conditions of continuous operation, the flow of the anode and cathode amalgam streams will be in countercurrent relation to one another. The anode and cathode effluent streams may be of the same or different composition depending on the relative flow rate selected of these streams based on considerations of over-all efficiency and specific power output.

Since galvanic cell 1 is operating at a temperature above the melting point of the electrolyte contained within the pores of tubes 3, thin fused salt layers between porous tubes 3 and the dense end pieces 4 and 5, located at the point of the pressurized joint, serve as seals 6 and 7 between the two liquid metal streams. Pressurized seal surfaces 14 are located between an upper metal support 15 and upper end piece 4 and between a lower metal support 16 and lower end piece 5. They are pressurized respectively by bellows 17 and 18, preferably of stainless steel, and serve to separate the liquid metal streams from intermediate compartments 19 and 20, which are respectively connected to upper and lower seals 21 and 22. These compartments are filled by a heat-resistant noncorrosive electrically insulating fluid such as an inert gas or a fused salt of low conductivity. The compartments 19 and 20 are maintained under the same pressure as the liquid metal compartments of the cell so that seals 14 are not subjected to any considerable pressure differential.

Seals 21 and 22, between the pressurized inlet fluid and the atmosphere, must be electrically insulating. An upper bolt 23 and a lower bolt 24 are also fitted with suitable electrical insulation. The electrical insulation is required in order to prevent short-circuiting of the galvanic cell. An anode lead 25 is joined by silver soldering to a flange 26, which is in contact with the anode stream in the interior of tubes 3. A cathode lead 27 is joined to a flange 28, which is in contact with cathode region 11. Thereby usable electric power is obtained from the cell. Compartments 19 and 20 are maintained under pressurized conditions by admitting an inert fluid such as argon through respective upper and lower conduits 29 and 30.

In FIG. 2 is shown a cross-sectional view of cell 1 taken along the line 2—2, similar numbers indicating similar parts. As may be noted, the cell unit contains seven porous ceramic tubes. It will, of course, be understood that depending upon power requirements and other operating parameters the cell may be designed to contain from one to several hundred ceramic tubes. In a multitube galvanic cell, one liquid-metal stream, preferably the anode, is supplied through the inside of tubes 3. The other metal stream flows through the outside region 11 surrounding the tubes, as shown in FIGS. 1 and 2. End pieces 4 and 5 will be provided with a sufficient number of openings to accommodate each of porous tubes 3. In general, the type of porous ceramic joint to dense ceramic joint will be the same in multitube cell designs as it will be for a single tube cell. Advantageously, by using a tubular design, the compactness of the cell, measured in weight of loaded cell per unit of electrolyte surface, will be at least twice that of a cell design of the same capacity containing porous matrices which are in disk or plate form.

The following example is illustrative of this invention but is not intended to restrict the scope thereof as previously described.

Example

The cell design used essentially corresponds to that shown in FIGS. 1 and 2 except that a matrix consisting of only a single porous tube was used. The porous tube was impregnated with electrolyte by forcing molten salt into the tube pores under pressurized condition at a temperature of 500° C. The ceramic tube was approximately 12 inches in length and consisted of high porosity beryllium oxide of high purity. The anhydrous alkali-metal salt mixture used to impregnate the porous tube consisted of a sodium salt eutectic mixture of approximately 58 mole percent sodium cyanide, 30 mole percent sodium iodide, and 12 mole percent sodium fluoride. A sodium-rich amalgam containing between 35 and 40 atom percent sodium was used to fill the interior of the tube and served as anode stream. A sodium-poor amalgam stream, containing approximately 1 atom percent sodium, served as cathode stream and was used to fill the region surrounding the outside of the tube.

The cell was operated under static conditions with the tube about one-half full of sodium-rich amalgam. Current was drawn at various loads, and the cell internal resistance was found to vary from 0.04 to 0.06 ohm. At 6 amperes, the voltage drop was 0.36 volt. The cell was discharged at one-half ampere, and a steady drop in open circuit voltage was observed. The amalgam level was increased to fill the tube about two-thirds full, and the open cell voltage increased slightly. The mercury level was increased with no apparent effect. The amalgam level was raised again so that the tube was completely filled with sodium-rich amalgam. At this point the open cell voltage stabilized at a value of 0.6 volt. Continuous operation of the cell with flowing electrode streams began at this point. Current densities of 50 to 100 ma./cm.$^2$ were maintained at electrode flow velocities of 0.5 to 2.5 cm./min. The cell internal resistance under these conditions was 0.03 ohm.

It will, of course, be understood that various modifications can be made in the design and operation of the galvanic cell utilizing a porous ceramic matrix of open tubular form without departing from the spirit of the invention. Thus while the principle, preferred construction, and mode of operation of the invention have been illustrated and described, it should be understood that within the scope of the appended claims the invention may be practiced otherwise than as specifically illustrated and described.

I claim:
1. In a high temperature galvanic cell including anode and cathode metal electrodes and an anhydrous fusible electrolyte disposed therebetween in cooperative relation, the anode, cathode and electrolyte being molten at the normal operation temperature of the cell
the improvement wherein a structurally independent open porous ceramic tube having inner and outer walls with free working surfaces contains the electrolyte in its pores and separates said molten electrodes during cell operation,
said tube serving as a conduit and having unobstructed flow of
(a) a first molten metal electrode stream longitudinally therethrough providing direct contact between said first molten metal electrode and said molten electrolyte along the free working surface of the inner wall of said tube, and
(b) a second molten metal electrode stream longitudinally therealong providing direct contact between said second molten metal electrode and said molten electrolyte along the free working surface of the outer wall of said tube.

2. A matrix-electrolyte element separating molten electrodes during cell operation in an alkali-metal amalgam galvanic cell comprising
a structurally independent open porous ceramic tube having inner and outer walls with free working surfaces containing in its pores an electrolyte of a fusible alkali-metal salt,
said tube serving as a conduit and having unobstructed flow of
(a) a first molten metal electrode stream longitudinally therethrough providing direct contact between said first molten metal electrode and said molten electrolyte along the free working surface of the inner wall of said tube, and
(b) a second molten metal electrode stream longitudinally therealong providing direct contact between said second molten metal electrode and said molten electrolyte along the free working surface of the outer wall of said tube.

3. An element according to claim 2 wherein the material of the porous ceramic tube is beryllium oxide and the anion of the alkali-metal salt is selected from the class consisting of halide, cyanide, carbonate, and mixtures thereof, carbonate where present being only a minor constituent in admixture.

4. A galvanic cell for use in a thermally regenerative system comprising an anode of an alkali-metal-rich amalgam, a cathode of an alkali-metal-poor amalgam, and a matrix-electrolyte element separating said anode and cathode amalgams, said element comprising at least one structurally independent open porous ceramic tube having inner and outer walls with free working surfaces containing therein an electrolyte of a fusible alkali-metal salt, the anion of said salt being selected from the class consisting of halide, cyanide, carbonate, and mixtures thereof, carbonate where present being only a minor constituent in admixture, the cathode and anode amalgams and the electrolyte being molten at the normal operating temperature of this cell, said tube serving as a conduit and having unobstructed flow of (a) a first molten metal electrode stream longitudinally therethrough providing direct contact between said first molten metal electrode and said molten electrolyte along the free working surface of the inner wall of said tube, and (b) a second molten metal electrode stream longitudinally therealong providing direct contact between said second molten metal electrode and said molten electrolyte along the free working surface of the outer wall of said tube.

5. A galvanic cell according to claim 4 wherein said matrix-electrolyte element comprises a plurality of porous ceramic tubes in parallel arrangement.

6. A galvanic cell for use in a thermally regenerative system comprising an anode of a sodium-rich amalgam, a cathode of a sodium-poor amalgam, and a matrix-electrolyte element separating said anode and cathode amalgams, said element comprising a plurality of structurally independent open porous beryllium oxide tubes in parallel arrangement each tube having inner and outer walls with free working surfaces and containing in its pores an electrolyte consisting of a mixture of sodium salts selected from the class consisting of ternary and quaternary salt systems and consisting essentially of at least three components selected from sodium cyanide, sodium fluoride, sodium iodide, and sodium carbonate, no component being present in excess of 80 mole percent, sodium carbonate being present in amount below 20 mole percent, the cathode and anode amalgams and the electrolyte being molten at the normal operating temperature of the cell, each tube serving as a conduit and having unobstructed flow of (a) a first molten metal electrode stream longitudinally therethrough providing direct contact between said first molten metal electrode and said molten electrolyte along the free working surface of the inner wall of said tube, and (b) a second molten metal electrode stream longitudinally therealong providing direct contact between said second molten metal electrode and said molten electrolyte along the free working surface of the outer wall of said tube.

7. A high temperature galvanic cell comprising a cylindrical metal body stable at the normal operating temperature of the cell, a plurality of spaced-apart structurally independent porous ceramic tubes disposed in longitudinal arrangement within said cylindrical metal body, said tubes having inner and outer walls with free working surfaces and containing in their pores an electrolyte molten at said operating temperature, a pair of dense ceramic end pieces disposed at opposite ends of said body and serving to support in rigid relation the ends of said porous ceramic tubes, means connecting said tubes in parallel arrangement, first conduit means for conducting a first molten metal electrode stream in a given direction and having unobstructed flow through the inside of the tubes, providing direct contact between said first molten metal electrode and said molten electrolyte along the free working surface of the inner walls of said tubes, and second conduit means for conducting a second molten metal electrode stream in countercurrent relation to said first stream through the common outside region surrounding said tubes, providing direct contact between said second molten metal electrode and said molten electrolyte along the free working surface of the outer walls of said tubes, whereby by interaction of the electrode streams through said electrolyte contained in the pores of the ceramic tubes there is a resultant continuous production of electrical energy.

8. A cell according to claim 7 wherein the porous ceramic tubes consist of high porosity beryllium oxide, and one of the molten metal electrodes is an alkali-rich amalgam and the other is an alkali-poor amalgam.

9. A cell according to claim 8 wherein the beryllium oxide tubes contain in the pores thereof an electrolyte consisting of a mixture of anhydrous alkali metal salts, the anion of said electrolyte being selected from the class consisting of halide, cyanide, carbonate, and mixtures thereof, carbonate where present being only a minor constituent in admixture.

References Cited

UNITED STATES PATENTS

| | | | |
|---|---|---|---|
| 3,228,797 | 1/1966 | Brown et al. | |
| 3,281,273 | 10/1966 | Oser | 136—86 |
| 3,099,587 | 7/1963 | Chambers et al. | 136—86 |
| 3,147,149 | 9/1964 | Postal | 136—86 |
| 3,245,836 | 4/1966 | Agruss | 136—83 |

WINSTON A. DOUGLAS, Primary Examiner.

C. F. LE FEVOUR, Assistant Examiner.

U.S. Cl. X.R.

136—6, 83